United States Patent [19]

Pavlica et al.

[11] Patent Number: 4,792,538

[45] Date of Patent: Dec. 20, 1988

[54] SPALL RESISTANT CHROME-ALUMINA REFRACTORY BRICK

[75] Inventors: Stanley R. Pavlica, Irwin; Dwight S. Whittemore, Bethel Park, both of Pa.

[73] Assignee: Dresser Industries, Inc., Dallas, Tex.

[21] Appl. No.: 103,114

[22] Filed: Sep. 30, 1987

[51] Int. Cl.$^4$ ............... C04B 35/10; C04B 35/12; C04B 35/48

[52] U.S. Cl. ............... 501/127; 501/105; 501/132

[58] Field of Search ............... 501/105, 127, 132

[56] References Cited

U.S. PATENT DOCUMENTS

| | | | |
|---|---|---|---|
| 3,948,670 | 4/1976 | Manigault | 501/127 |
| 4,039,344 | 2/1977 | Nishikawa et al. | 501/104 |
| 4,126,654 | 11/1978 | Montgomery | 501/132 |
| 4,290,814 | 9/1981 | Pavlica et al. | 501/132 |
| 4,308,067 | 12/1981 | Guigonis | 501/132 |
| 4,544,643 | 10/1985 | Fraser | 501/127 |

*Primary Examiner*—Mark L. Bell
*Attorney, Agent, or Firm*—Sigalos, Levine & Montgomery

[57] ABSTRACT

An chrome-alumina refractory brick prepared by pressing and firing a mixture consisting essentially of about 15 to 90 percent by weight of a fused chrome-alumina grain, 5 to 25 percent by weight of chromic oxide, up to 30 percent by weight of a zirconia-containing grain, and the balance alumina.

4 Claims, No Drawings

SPALL RESISTANT CHROME-ALUMINA REFRACTORY BRICK

BACKGROUND OF THE INVENTION

The present invention relates to spall resistant high alumina refractory brick which are particularly suitable for use in high temperature operations such as coal gasifiers, carbon black reactors, glass furnaces and the like, where conditions are such that slag resistance and resistance to spalling are required while at the same time the brick formulations must show high refractoriness.

Efforts have been made to have such products and to an extent they are somewhat successful.

Thus, U.S. Pat. No. 4,544,643 is directed to a chrome-alumina brick used for high temperature applications but it does not have the necessary spalling resistance desired. In like manner, U.S. Pat. No. 4,290,814 which is again a high alumina refractory brick but the chromic oxide content of the brick is not sufficient to resist attack of slags such as coal ash slags. Other high alumina refractories for use at high temperature operations are set forth in U.S. Pat. Nos. 3,948,670 and 4,039,344, but again these fail to have the spalling resistance desired or the high strength required.

SUMMARY OF THE INVENTION

The present invention overcomes the deficiencies of the prior art and provides a refractory brick with good thermal shock resistance and slag resistance made from a formulation of high refractoriness.

Briefly, the present invention comprises a chrome-alumina refractory brick prepared from pressing and firing a mixture consisting essentially of from about 15 to 90 percent by weight of a fused chrome-alumina grain, 5 to 25 percent by weight chromic oxide, up to 30 percent by weight of zirconia-containing grain, and the balance alumina.

DETAILED DESCRIPTION

The present invention requires a proper balance between the fused chrome-alumina grain and the zirconia-containing grain in order to get the balance of propeties required; namely the spall resistance, slag resistance, and high strength in the high temperature applications for which these brick are intended.

As to the components of the mix, the chromic oxide is preferably a very finely divided grain having an average particle size of about 1 micron.

The fused chrome-alumina grain is preferably a mixture of −4 mesh coarse fraction and a fine fraction containing a substantial amount of −325 mesh, with the −4 mesh comprising about 70 to 75 volume percent and the balance being the −325 mesh. The grain may contain from about 25% to 90% by weight of chromic oxide with fused grain containing about 75% by weight $Cr_2O_3$ being preferred.

The total chromic oxide content of the mixture is obtained through the combination of the finely sized chromic oxide and the fused chrome-alumina grain. For brick having a fine chromic oxide content of over about 25% by weight of the total weight of the mix, it is preferred to add the additional level of chromic oxide in the form of coarse grain fused chrome alumina. The use of levels of the finely divided chromic oxide above about 25% makes it difficult to press the brick and is not commercially desirable.

As to the zirconia-containing grain, it can be any zirconia-alumina containing composition such as a fused zirconia-alumia or zirconia-mullite grain preferably containing about 20-45% zirconia by weight with the balance being mainly alumina or a naturally occurring or synthetic form of zirconia ($ZrO_2$). It is recognized that such grains ordinarily contain minor portions of other material such as titania, soda and in the case of zirconia-mullite substantial amounts; up to about 18% by weight, of silica.

The balance of the composition is alumina and in this instance it is preferred to use tabular alumina although refractory grade calcined alumina or fused alumina or bauxite can also be utilized. It is preferred to use a higher grade alumina containing about 99% by weight $Al_2O_3$ although other less pure aluminas can be utilized or blends of less pure alumina with the higher grades. The alumina used should contain at least about 85% by weight $Al_2O_3$.

The relationship between the materials are important to the extent that the mix from which the brick is made contain preferably at least about 16% by weight chromic oxide.

As to proportion, the table below lists the operative and preferred ranges in percent by weight.

|  | OPERATIVE | PREFERRED 1 | PREFERRED 2 |
| --- | --- | --- | --- |
| Chrome-alumina grain | 15–90% | 65–85% | 20–35% |
| Chromic Oxide | 5–25% | 10–20% | 10–20% |
| Zirconia-containing grain | up to 30% | 10–20% | 5–20% |
| Alumina | balance | 0 | 30–55% |

Two prefererd ranges are given to show the wide range of alumina content possible in the mixture which will result in brick having requisite spall resistance and resistance to acid slags.

The conditions of forming the brick, are those ordinarily used in preparing such high alumina brick. Namely the ingredients are simply mixed together with any conventional bonding agent such as lignosulfonates, dextrins, cellulose and the like; ordinarily used in a percentage of 2 to 4% by weight, to form a formable mix and then the bricks are formed by conventional refractory forming techniques such as hydraulic, mechanical, or friction screw pressing and fired at about 2800° F. or above to form the desired brick.

The resultant brick are excellent for use in high temperature applications since they do have high spalling resistance as well as high strength and excellent resistance to acid slags such as coal ash slags encountered in coal gasifiers.

The invention will be further described in connection with the following examples which are set forth for purposes of illustration only.

EXAMPLES 1 TO 5

A series of five brick batches was made from the mixes shown in Table I under the same molding pressures and firing temperatures. These bricks were then tested for strength and spalling resistance and the results are also set forth in Table I.

TABLE I

| EXAMPLE NO. | 1 | 2 | 3 | 4 | 5 |
| --- | --- | --- | --- | --- | --- |

Mix
Fused Chrome-Alumina

TABLE I-continued

| EXAMPLE NO. | 1 | 2 | 3 | 4 | 5 |
|---|---|---|---|---|---|
| Grain (75% $Cr_2O_3$) | | | | | |
| −4 m | 73% | 63% | 53% | 67% | 64% |
| BMF (70% −325 m) | 12 | 12 | 12 | 13 | 11 |
| Fused Alumina-Zirconia Grain | | | | | |
| −8 + 28 m | — | 10 | — | — | — |
| −8 + 65 m | — | — | 20 | — | — |
| Baddeleyite. −28 m | — | — | — | 5 | 10 |
| Chromic Oxide | 15 | 15 | 15 | 15 | 15 |
| Fired Bulk Density, pcf: | 262 | 254 | 253 | 265 | 266 |
| Modulus of Rupture, psi | | | | | |
| At Room Temperature | 4060 | 1180 | 1180 | 2180 | 1430 |
| At 2700° F.: | 2780 | 1310 | 1980 | 2400 | 1720 |
| Apparent Porosity, %: | 14.1 | 15.4 | 15.8 | 13.7 | 14.3 |
| Apparent Specific Gravity: | 4.80 | 4.75 | 4.70 | 4.84 | 4.89 |
| Modulus of Elasticity, psi × $10^6$: | 19.2 | 5.9 | 4.8 | 13.6 | 8.7 |
| Prism Spalling Test | | | | | |
| 2200° F. With Water Quench Cycles to Failure: | 2 | 12 | 15 | 5 | 8 |
| Range: | — | 11 to 13 | 14 to 16 | 4 to 6 | 6 to 11 |
| Loss of Strength Test, 5 Cycles 2200° F. to Air | | | | | |
| MOR Before Cycling, psi: | 3280 | 750 | 810 | Not Run. | 1265 |
| MOR After Cycling, psi: | 435 | 445 | 455 | Not Run. | 660 |
| % Loss of Strength: | 87 | 41 | 44 | | 48 |
| Drip Slag Test at 2900° F. Using 4800 grams Coal Ash Slag (Reducing) | | | | | |
| Volume Eroded, cu. cm.: | 5 | Not Run. | 6 | Not Run. | 6 |

EXAMPLES 6 TO 9

A series of four brick batches was made from the mixes shown in Table II under the same molding pressures and firing temperatures. These bricks were then tested for strength and spalling resistance and the results are also set forth in Table II.

TABLE II

| EXAMPLE NO. | 6 | 7 | 8 | 9 |
|---|---|---|---|---|
| Mix | | | | |
| Tabular Alumina, −6 m | 48% | 43% | 48% | 33% |
| Fused Chrome-Alumina Grain (75% $Cr_2O_3$) | | | | |
| −4 m | 22 | 22 | — | 22 |
| −28 m | — | — | 17 | — |
| BMF (70% −325 m) | 5 | 5 | 10 | 5 |
| Fused Alumina-Zirconia Grain | | | | |
| −8 + 28 mesh | — | 10 | 5 | — |
| −8 + 65 m | — | — | — | 20 |
| Chromic Oxide | 20 | 20 | 20 | 20 |
| Fired Bulk Density, pcf: | 229 | 224 | 225 | 226 |
| Modulus of Rupture, psi | | | | |
| At Room Temperature | 3640 | 1375 | 1495 | 1295 |
| At 2700° F.: | 2935 | 2365 | 2625 | 2265 |
| Apparent Porosity, %: | 14.0 | 16.6 | 16.1 | 16.9 |
| Apparent Specific Gravity: | 4.22 | 4.28 | 4.26 | 4.33 |
| Modulus of Elasticity, psi × $10^6$: | 17.7 | 8.1 | 8.5 | 7.1 |
| Loss of Strength Test, 5 Cycles 2200° F. to Air | | | | |
| MOR Before Cycling, psi | 3700 | 1360 | 1670 | 1260 |
| MOR After Cycling, psi | 500 | 880 | 925 | 685 |
| % Loss of Strength: | 86 | 35 | 45 | 46 |

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A refractory composition for forming a spalling resistant and slag resistant brick consisting essentially of about 15 to 90 percent by weight of a fused chrome-alumina grain, 5 to 25 percent by weight chromic oxide, up to 30 percent by weight of a zirconia-containing grain, and the balance alumina.

2. The refractory composition of claim 1 wherein there is from about 65 to 85% by weight fused chrome-alumina grain, 10–20% by weight chromic oxide, 10 to 20% by weight zirconia-containing grain, and no alumina.

3. The refractory composition of claim 1 wherein there is from about 20 to 35% by weight of fused chrome-alumina grain, 10–20% by weight chromic oxide, 5 to 20% by weight zirconia-containing grain, and 30–55% by weight alumina.

4. The refractory composition of claims 1, 2, or 3 wherein the zirconia-containing grain is selected from a fused zirconia-alumina, zirconia-mullite, a naturally occurring zirconia, or a synthetic zirconia and the alumina is tabular alumina.

* * * * *